United States Patent
Cheng et al.

(10) Patent No.: US 10,560,023 B2
(45) Date of Patent: Feb. 11, 2020

(54) MULTI-PHASE POWER REGULATOR

(71) Applicant: TEXAS INSTRUMENTS INCORPORATED, Dallas, TX (US)

(72) Inventors: Kuang-Yao Cheng, Bedford, NH (US); Wenkai Wu, East Greenwich, RI (US); Preetam Tadeparthy, Bangalore (IN); Nancy Zhang, Westford, MA (US); Dattatreya Baragur Suryanarayana, Bangalore (IN); Naga Venkata Prasadu Mangina, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/849,504

(22) Filed: Dec. 20, 2017

(65) Prior Publication Data
US 2019/0190386 A1   Jun. 20, 2019

(51) Int. Cl.
*H02M 3/158* (2006.01)
*H02M 3/335* (2006.01)
*G06F 1/28* (2006.01)
*G05F 1/565* (2006.01)
*H02M 1/00* (2006.01)

(52) U.S. Cl.
CPC .......... *H02M 3/1584* (2013.01); *G05F 1/565* (2013.01); *G06F 1/28* (2013.01); *H02M 3/33561* (2013.01); *H02M 2001/0025* (2013.01)

(58) Field of Classification Search
CPC .. H02M 3/158; H02M 3/1582; H02M 3/1584; H02M 2003/1586; H02M 3/1588
See application file for complete search history.

(56) References Cited

U.S. PATENT DOCUMENTS

| | | | |
|---|---|---|---|
| 3,521,150 A * | 7/1970 | Bates | H02M 3/10 323/272 |
| 4,924,170 A * | 5/1990 | Henze | H02J 1/102 323/272 |
| 6,150,803 A * | 11/2000 | Varga | H02M 3/1584 307/60 |
| 8,098,505 B1 * | 1/2012 | Choi | H02M 1/4225 323/272 |
| 9,606,559 B2 * | 3/2017 | Ozawa | G05F 1/575 |
| 9,755,517 B2 * | 9/2017 | Kobayashi | H02M 3/158 |

* cited by examiner

*Primary Examiner* — Gary L Laxton
(74) *Attorney, Agent, or Firm* — Tuenlap Chan; Charles A. Brill; Frank D. Cimino

(57) ABSTRACT

A circuit for a multi-phase power regulator including a power stage with a first phase and a second phase, the circuit including phase management circuitry coupled to the first phase and the second phase to control the first phase and the second phase, a first comparator coupled to an output of the multi-phase power regulator to compare a value of the output of the multi-phase power regulator to a first threshold value to produce a first comparison result, and phase shedding circuitry coupled to the first comparator and the phase management circuitry to control the phase management circuitry to activate or deactivate the second phase based at least partially on the first comparison result.

10 Claims, 3 Drawing Sheets

US 10,560,023 B2

MULTI-PHASE POWER REGULATOR

SUMMARY

According to aspects of the disclosure, a circuit for use in system with a multi-phase power regulator to supply power to an electrical load, the multi-phase power regulator including a power stage including a first phase and a second phase, the circuit including phase management circuitry coupled to the first phase and the second phase to control the first phase and the second phase, a first comparator coupled to an output of the multi-phase power regulator to compare a value of the output of the multi-phase power regulator to a first threshold value to produce a first comparison result, and phase shedding circuitry coupled to the first comparator and the phase management circuitry to control the phase management circuitry to activate or deactivate the second phase based at least partially on the first comparison result.

In other aspects of the disclosure, a multi-phase power regulator can include a power stage comprising a first phase that comprises at least a first switch coupled at a first terminal to a voltage source and to couple at a second terminal to a first inductor coupled to an output node of the multi-phase power regulator, and a first driver coupled to the first switch to control the first switch. The power stage also comprises a second phase that comprises at least a second switch coupled at a first terminal to the voltage source and to couple at a second terminal to a second inductor coupled to the output node of the multi-phase power regulator, and a second driver coupled to the second switch to control the second switch. The multi-phase power regulator can also include phase management circuitry coupled to the first driver and the second driver and to control the first driver and the second driver, phase shedding circuitry coupled to the phase management circuitry, and a first comparator coupled to the output node of the multi-phase power regulator and an input of the phase shedding circuitry.

In other aspects of the disclosure, a method of multi-phase power regulator operation can include providing, by a multi-phase power regulator, a first amount of current at a first output voltage level to a load using a first phase of the multi-phase power regulator, detecting, by the multi-phase power regulator, first electrical characteristics associated with providing the first amount of current at the first output voltage level to the load that are indicative of an increased current draw by the load activating, by the multi-phase power regulator, at least one additional phase of the multi-phase power regulator according to the detected first electrical characteristics to provide a second amount of current to the load, detecting second electrical characteristics associated with providing the second amount of current at the first output voltage level to the load that are indicative of a decreased current draw by the load, and deactivating the additional phases of the multi-phase power regulator according to the detected second electrical characteristics.

BRIEF DESCRIPTION OF THE DRAWINGS

For a detailed description of various examples, reference will now be made to the accompanying drawings in which.

DETAILED DESCRIPTION

Multi-phase power regulators include phase management circuitry for controlling how many, and which, phases are active in the multi-phase power regulator. The more current being drawn by a bad coupled to a multi-phase power regulator, the more phases may be active in the multi-phase power regulator. Conversely, for no, or low, bad conditions, fewer phases may be active in the multi-phase power regulator (e.g., such as only one phase). Multi-phase power regulators may add phases one at a time based on the current being drawn by the bad. However, when the current draw of the bad changes rapidly, the multi-phase power regulator may not have sufficient time to add in, or activate, enough phases to supply the current to the bad, thereby resulting in a voltage undershoot by the multi-phase power regulator. Conversely, if the multi-phase power regulator adds additional phases to supply additional current to the bad too quickly and the current draw of the bad drops suddenly after increasing suddenly, the multi-phase power regulator may experience a voltage overshoot in which excess current is provided, operating efficiency is reduced, and operating cost is increased.

Disclosed herein are examples of architectures/topologies that provide for a multi-phase power regulator with multi-level phase adding and/or removing. The multi-phase power regulator at least partially mitigates the above undershoot and overshoot by adding (activating) or removing (deactivating) multiple phases of the multi-phase power regulator at one time in response to electrical characteristics of a load. For example, in response to a value of a voltage level present across the load exceeding (or decreasing below) a threshold and/or in response to a value of an amount of current (e.g., momentary or average) drawn by the load exceeding (or decreasing below) a threshold, the multi-phase power regulator can add (or removes) multiple phases at once to satisfy a current draw of the load while also operating in an efficient manner. For example, when a current draw of the load changes, either by increasing or decreasing, the multi-phase power regulator can add or remove phases so that a selected number of phases capable of supplying the current to the load are active, operating efficiently for that given current draw. In some examples, the multi-phase power regulator implements the multi-level phase adding by implementing one or more comparators that are each configured to compare an output voltage of the multi-phase power regulator to a respective threshold (e.g., reference) value.

Figure 1:
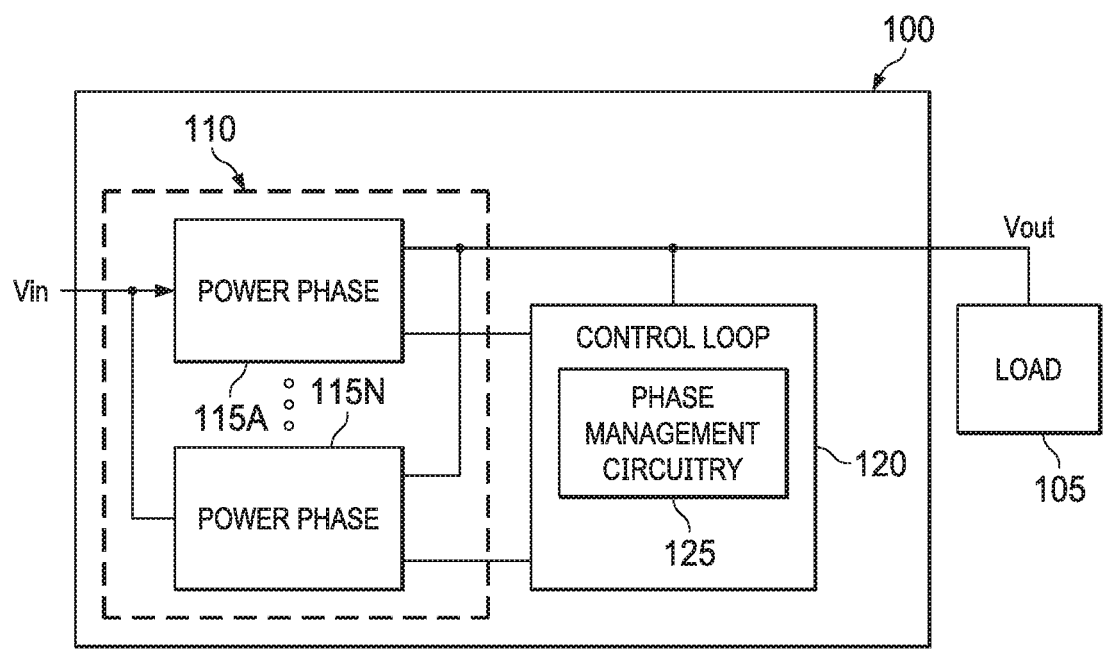
FIG. 1 shows a block diagram of an illustrative multi-phase power regulator.

Referring now to FIG. 1, a block diagram of an illustrative multi-phase power regulator 100 is shown. In at least one example, the multi-phase power regulator 100 is configured to couple to a load 105, by way of couplings such as wires, terminals, metal traces on a printed circuit board, metal routing on a silicon substrate, or any other suitable form of conductive coupling to provide a regulated output voltage (illustrated as VOUT) to the load 105 based at least partially on an input voltage (illustrated as VIN). The load 105 may be, for example, an electrical bad.

In at least one example, the multi-phase power regulator 100 comprises a power stage 110 that comprises a plurality of phases 115A-115N, and a control loop 120 at least partially for controlling the plurality of phases 115A-115N. In some examples, the control loop 120 includes phase management circuitry 125 that at least partially determines whether to activate (add) or deactivate (remove) one or more of the plurality of phases 115A-115N. In at least one example, the control loop 120 further comprises a multi-level plurality of comparators (not shown) for comparing an output of the multi-phase power regulator 100 to a corresponding multilevel plurality of thresholds.

The multilevel comparators may each provide comparison results to the phase management circuitry 125. Based on the comparison results, the phase management circuitry 125 transmits one or more signals to add or remove one or more of the plurality of phases 115A-115N from an active path of the multi-phase power regulator 100 (e.g., from a path of the multi-phase power regulator 100 that affects the output of the multi-phase power regulator 100). In at least one example, when the comparison results indicate to the phase management circuitry 125 that the output of the multi-phase power regulator 100 has fallen (or risen) past a first threshold but not past a second threshold, the phase management circuitry 125 transmits a signal to add (or remove) one or more of the plurality of phases 115A-115N in the active path of the multi-phase power regulator 100. In another example, when the comparison results indicate to the phase management circuitry 125 that the output of the multi-phase power regulator 100 has fallen (or risen) past both the first threshold and the second threshold, the phase management circuitry 125 transmits a signal to add (or remove) one or more additional ones of the plurality of phases 115A-115N in the active path of the multi-phase power regulator 100. In this way, the multi-phase power regulator 100 more rapidly responds to variations in the output of the multi-phase power regulator 100 resulting from a power draw of the bad 105 and provides a more regulated, consistent power supply to the bad 105.

Figure 2:
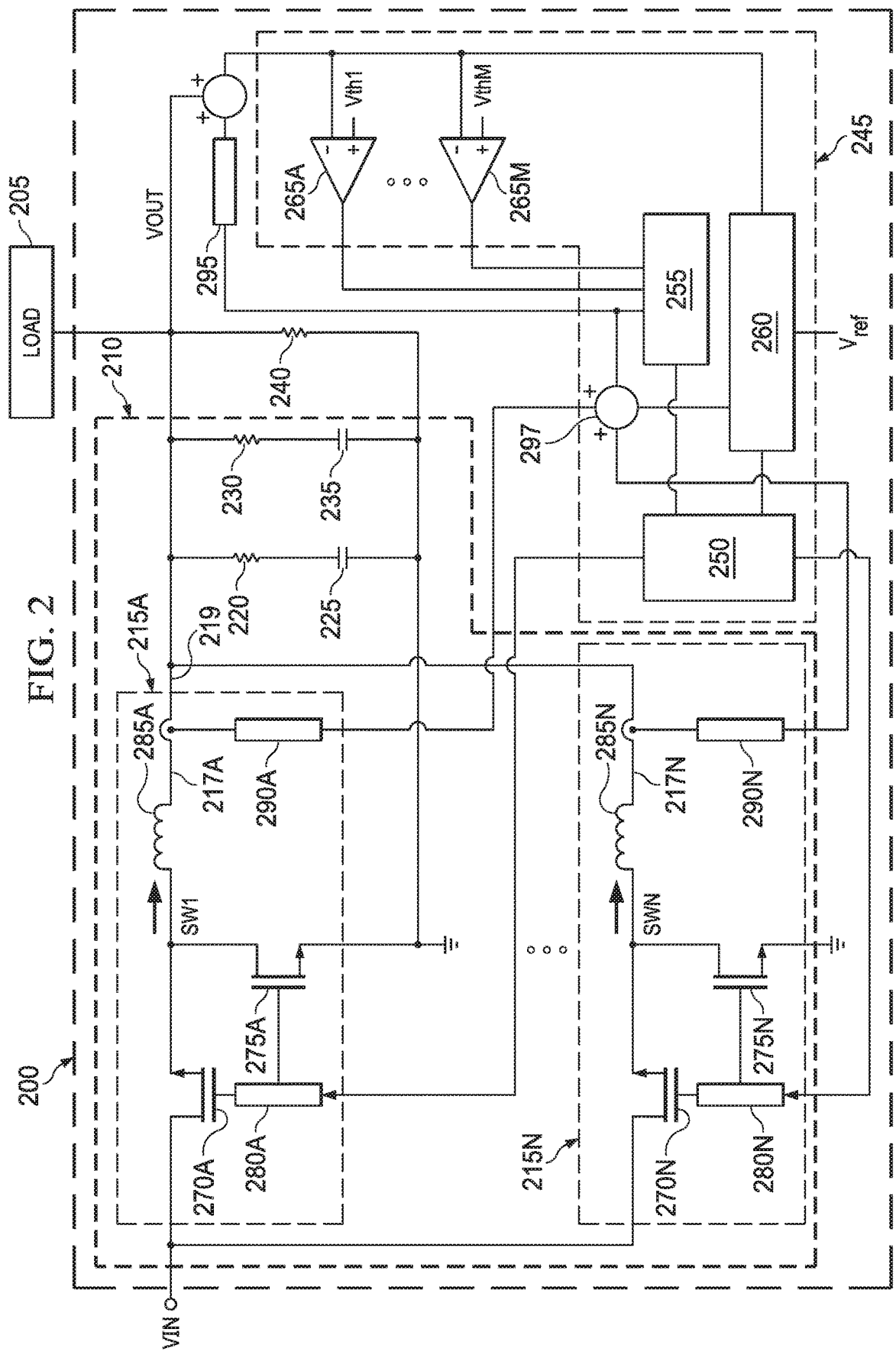
FIG. 2 shows a schematic diagram of an illustrative multi-phase power regulator.

Referring now to FIG. 2, a schematic diagram of an illustrative multi-phase buck power regulator 200 with multilevel phase activation/inactivation is shown. In at least one example, at least some aspects of the multi-phase buck power regulator 200 may be substantially similar to the multi-phase power regulator 100, discussed above with reference to FIG. 1. In at least one example, the multi-phase buck power regulator 200 is configured to couple to a load 205, by way of couplings such as wires, metal traces on a printed circuit board, metal routing on a silicon substrate, or any other suitable form of conductive coupling. The load 205 is, for example, an electrical load.

In at least one example, the multi-phase buck power regulator 200 comprises a power stage 210 that comprises a plurality of phases 215A-215N (where N is one or more), each with power transistor switches 270A/275A-270N/275N coupled at a switch node SW1-SWN to an energy storage (buck) inductor 285A-285N, and a power switch driver 280A-280N. Each of the phases 215A-215N includes a respective phase output 217A-217N, coupled at a current summing node 219 to a shared output capacitor network, with output capacitors 225/235 each with effective series resistance (ESR) represented by resistors 220/230. Multi-phase power stage 210 supplies load current through the current summing node 219 to the load 205 with load resistance 240, at the regulated output voltage VOUT. A control loop 245 coupled to each phase (power switches 270A/275A-270N/275N) controls operation of the phases 215A-215N, including phase activation/inactivation, and duty cycle switching during active phase operation, and including phase adding and/or removing according to this disclosure.

In at least one example, the control loop 245 comprises phase management circuitry 250, phase shedding circuitry 255, a compensator 260, and one or more comparators 265A to 265M (where M is any non-negative whole number greater than or equal to zero). In some examples, the multi-phase buck power regulator 200 may optionally comprise a dynamic ramp (not shown) to improve jitter performance of the multi-phase buck power regulator 200, a load line 295 to lower the output voltage with increasing load currents to save power consumption (e.g., thereby improving load transient performance), or other electronic circuits or components, the scope of which are not limited herein.

In at least one example, the first phase 215A comprises a first switch 270A, a second switch 275A (which in some examples can be replaced by a diode), a driver 280A, a phase inductor 285A, and a current sense resistor 290A. While the above and following discussions refer to couplings and operations of the first phase 215A with respect to other components of the multi-phase buck power regulator 200, such discussions are equally applicable to each of the additional phases 215N, each of which is individually controllable by the phase management circuitry 250 to provide for the functionality and operation disclosed herein.

The example multi-phase buck power regulator 200 illustrated and described in connection with FIG. 2 implements a buck regulator architecture. In other examples, a multi-phase power regulator according to this disclosure can be implemented as other multi-phase regulator topologies, such as boost or buck-boost, with selected modulations (such as PWM and PFM).

In at least one example, the multi-phase buck power regulator 200 can be implemented with a controller such as including the circuitry of control loop 245, and the phase drivers 280A-280N (to couple to external power transistor switches 270A/275A-270N/275N, such as through gate drive terminals of the controller). In at least another example, the multi-phase buck power regulator 200 can be implemented with a converter in which the controller is integrated with the power transistor switches 270N/275A-270N/275N (to couple to the external inductors 285A-285N (through switch node terminals SW1-SWN). In at least another example, the multi-phase buck power regulator 200 is implemented as a standalone device (e.g., implemented on its own substrate, enclosed within its own electrical chip package, etc.) and coupled to the bad 205 which is, or is included in, a separate device. In another example, the multi-phase buck power regulator 200 is implemented with other devices, such as the load 205 (e.g., on a substrate including other devices, enclosed in an electrical chip package that includes other devices, etc.).

In at least one example, the phase management circuitry 250 is coupled to the driver 280A and configured to control adding and/or removing (e.g., activating and/or deactivating) the first phase 215A of the multi-phase buck power regulator 200. Based on a control signal received from the phase management circuitry 250, the driver 280A is configured to control the first switch 270A and/or the second switch 275A to control duty cycle switching operation of the first phase 215A (such as based on PWM or PFM modulation). For example, in response to receipt of a first control signal from the phase management circuitry 250, the driver 280A turns the first switch 270A on while turning the second switch 275A off, and in response to receipt of a second control signal from the phase management circuitry 250, the driver 280A turns the first switch 270A off while turning the second switch 275A on. Power Switches 270A/275A are connected at a switch node SW1 to phase inductor 285A. In at least one example, when the driver turns the first switch 270A on (and correspondingly the second switch 275A off) the inductor 285A charges from an input voltage (illustrated as VIN) of the multi-phase buck power regulator 200, through switch node SW1. When the driver turns the first switch 270A off (and correspondingly the second switch 275A on), the inductor 285A discharges through phase output 217A to a remainder of the power stage 210 and the load 205.

The couplings and operation of the other phase(s) 215N are substantially the same. The phase management circuitry 250 is coupled to each respective driver 280N, and configured to control adding and/or removing (e.g., activating and/or deactivating) the corresponding phase 215N. Based on a control signal received from the phase management circuitry 250, the driver 280N is configured to control the power switches 270N/275N, which are connected at a switch node SWN to phase inductor 285N, to control duty cycle switching operation of the phase 215N, including charging and discharging inductor 285N, to supply load current at phase output 217N to the current summing node 219.

The current sense resistor 290A is coupled between the inductor 285A, the compensator 260, and the phase shedding circuitry 255 and is configured to indicate an amount of current flowing through the inductor 285A (and correspondingly the first phase 215A). In at least one example, each current sense resistor 290A to 290N in the multi-phase buck power regulator 200 is coupled to a common node 297 prior to coupling to the compensator 260 and the phase shedding circuitry 255. Coupling to the common node 297, in some examples, provides a summation of voltages present across each current sense resistor 290A to 290N to indicate to the compensator 260 and the phase shedding circuitry 255 a total current drawn by the load 205 from the multi-phase buck power regulator 200. Based on the total current drawn by the load 205 from the multi-phase buck power regulator 200 (or an average of the current drawn by the load 205 over a given period of time), in at least one example, the phase shedding circuitry 255 determines whether one or more additional phase(s) 215N should be added and/or removed from the multi-phase buck power regulator 200.

In another example, the phase shedding circuitry 255 determines whether additional phases 215N should be added and/or removed from the multi-phase buck power regulator 200 based on the regulated output voltage VOUT of the multi-phase buck power regulator 200. For example, in some circumstances it may be desirable to add and/or remove additional phases 215N from the multi-phase buck power regulator 200 more quickly than may be achieved through the above current-based process. In at least one example, when a current draw of the load 205 increases suddenly, a value of the output voltage may drop. In such examples, the multi-phase buck power regulator 200 compares the output voltage to one or more thresholds to determine whether multiple additional phases 215N should be added and/or removed from the multi-phase buck power regulator 200. In at least one example, the multi-phase buck power regulator 200 is configured to compare the output voltage to respective thresholds (Vth1-VthM) via the comparators 265A to 265M. For example, the comparator 265A compares the output voltage to a first threshold (illustrated as Vth1) and each comparator 265M compares the output voltage to a different respective threshold VthM.

Based on an output of the respective comparator 265A to 265M, the phase shedding circuitry 255 determines whether additional phases 215N should be added and/or removed from the multi-phase buck power regulator 200. In at least one example, the first threshold is the input voltage minus a first predefined voltage drop. When the comparator 265A indicates that the output voltage is less than the first threshold, the phase shedding circuitry 255 is configured to instruct the phase management circuitry 250 to add a first number of additional phases 215N to the multi-phase buck power regulator 200. Similarly, in at least one example, a second threshold is the input voltage minus a second predefined voltage drop that is greater than the first predefined voltage drop. When a second comparator 265M indicates that the output voltage is less than the second threshold, the phase shedding circuitry 255 is configured to instruct the phase management circuitry 250 to add a second number of additional phases 215N to the multi-phase buck power regulator 200, where the second number of additional phases 215N is greater than the first number of additional phases 215N. In various examples, the multi-phase buck power regulator 200 comprises any number of comparators 265M that provide for a desired granularity of comparisons of the output voltage to different thresholds. In at least one example, the phase shedding circuitry 255 instructs the phase management circuitry 250 based on an output of a comparator 265M that performs a comparison between the output voltage and a greatest variation from the input voltage.

For example, in at least one example, the comparator 265A is configured to compare the output voltage to a first threshold of approximately the input voltage minus 60 millivolts and a second comparator 265M is configured to compare the output voltage to a second threshold of approximately the input voltage minus 220 millivolts. In this example, when the comparator 265A indicates that the output voltage is less than the first threshold, the phase shedding circuitry 255 indicates to the phase management circuitry 250 to add four additional phases 215N to the multi-phase buck power regulator 200 and when the second comparator 265M indicates that the output voltage is less than the second threshold, the phase shedding circuitry 255 indicates to the phase management circuitry 250 to add six additional phases 215N to the multi-phase buck power regulator 200.

In at least one example, the phase shedding circuitry 255 is any digital logic structure or other digital or analog electrical component capable of receiving the output of the comparators 265A to 265M and/or coupling to the current sense resistor 290A (and other current sense resistors 290N) and instructing the phase management circuitry 250 to add or remove additional phases 215N. The instructing is based on, for example, an output of at least one of the comparators 265A to 265M and/or a value received from the current sense resistor 290A (or a combination of the current sense resistor 290A and other current sense resistors 290N). In at least one example, the phase management circuitry 250 is any digital logic structure or other digital or analog electrical component capable of receiving instructions from the phase shedding circuitry 255 and/or the compensator 260 and controlling the first phase 215 and/or the additional phases 215N to turn on and/or turn off.

The compensator 260 is coupled to the phase management circuitry 250 and configured to receive the output voltage of the multi-phase buck power regulator 200 and/or a value from the current sense resistor 290A (or a combination of the current sense resistor 290A and other current sense resistors 290N). In some examples, it may be desired to hold the output voltage at, or approximately at, a particular value (illustrated as Vref) irrespective of changes in current drawn by the load 205 from the multi-phase buck power regulator 200. In such examples, the compensator 260 monitors the output voltage and/or output current of the multi-phase buck power regulator 200 and provides compensation based on the desired output voltage. The compensator 260 may be any suitable compensator and may provide the compensation according to any suitable manner, a scope of which is not limited herein.

Figure 3:
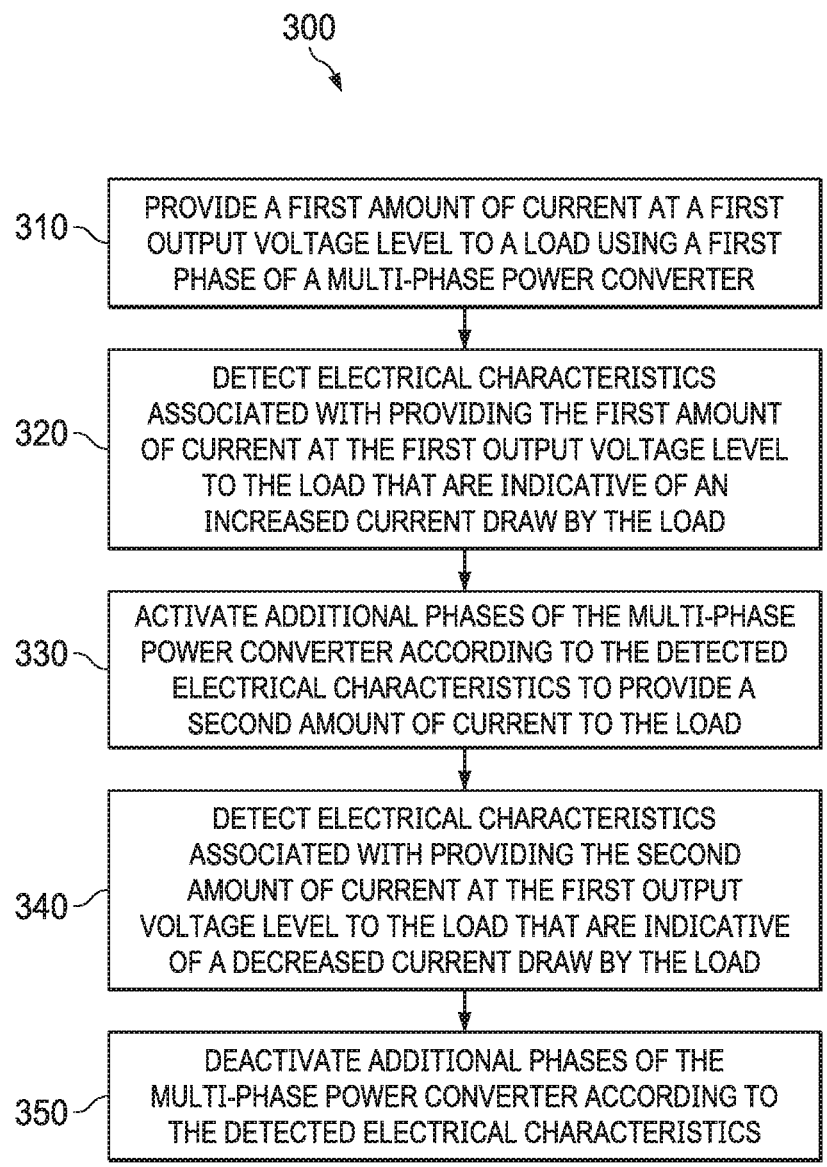
FIG. 3 is a flowchart of an illustrative method of multi-phase power regulator operation.

Referring now to FIG. 3, a flowchart of an illustrative method 300 of multi-phase power regulator operation is shown. The method 300 is performed, for example, by a multi-phase power regulator, such as the multi-phase buck power regulator 200, discussed above with respect to FIG. 2, to add and/or remove phases based on demands placed on the multi-phase power regulator by a bad.

At operation 310, the multi-phase power regulator operates to provide a first amount of current at a first output voltage level to a bad using a first phase of the multi-phase power regulator. At operation 320, the multi-phase power regulator detects electrical characteristics associated with providing the first amount of current at the first output voltage level to the bad that are indicative of an increased current draw by the bad. The electrical characteristics are, for example, any one or more of the first output voltage level decreasing beyond a threshold or an amount of current provided by the first phase increasing above a threshold. In at least one example, the multi-phase power regulator detects the electrical characteristics, for example, by comparing, by a comparator, the first output voltage to a threshold value that is, for example, an input voltage of the multi-phase power regulator minus a predetermined value. The multi-phase power regulator further detects the electrical characteristics, for example, by comparing, by a second comparator, the first output voltage to a second threshold value that is, for example, the input voltage of the multi-phase power regulator minus a second predetermined value greater than the first predetermined value. In another example, the multi-phase power regulator detects the electrical characteristics by comparing a current provided by each active phase in the multi-phase power regulator, a total current provided by all active phases in the multi-phase power regulator, or an average current provided by the multi-phase power regulator to a current threshold that is, for example, a maximum current value for supply by one active phase of the multi-phase power regulator or all active phases of the multi-phase power regulator.

At operation 330, the multi-phase power regulator activates one or more additional phase(s) of the multi-phase power regulator according to the detected electrical characteristics to provide a second amount of current to the bad. For example, in response to the current draw by the first phase exceeding the current threshold but the output voltage, not dropping below the first threshold or the second threshold, in at least one example, the multi-phase power regulator activates at least one additional phase in the multi-phase power regulator. In response to the output voltage dropping below the first threshold, in at least one example, the multi-phase power regulator activates a first number of additional phase in the multi-phase power regulator, where the first number of additional phases is greater than one. In response to the output voltage dropping below the second threshold, in at least one example, the multi-phase power regulator activates a second number additional phase in the multi-phase power regulator, where the second number of additional phases is greater than one. Activating the additional phases in the multi-phase power regulator, in at least one example, provide additional current to the bad to satisfy the increased current draw of the bad and provide a second amount of current to the bad, where the second amount of current is sufficient to satisfy the increased current draw of the bad. The additional phases are activated, for example, based on a determination of phase shedding circuitry that is operable, in at least one example, to determine an optimal (e.g., in terms of efficiency) number of phases to be active in the multi-phase power regulator based on the current draw of the load (e.g., whether increased or decreased). After making the determination, in at least one example, the phase shedding circuitry instructs phase management circuitry how many (and/or which) additional phases in the multi-phase power regulator to activate.

At operation 340, the multi-phase power regulator detects electrical characteristics associated with providing the second amount of current at the first output voltage level to the load that are indicative of a decreased current draw by the load. The detection is performed, for example, in a manner substantially similar to operation 320. At operation 350, the multi-phase power regulator deactivates additional phases of the multi-phase power regulator according to the detected electrical characteristics. For example, when a detected current does not exceed the current threshold and/or the detected output voltage is not less than the first threshold or the second threshold, the multi-phase power regulator deactivates the additional phases according to the detected electrical characteristics. Similarly, when the detected output voltage is less than the first threshold but not less than the second threshold, the multi-phase power regulator deactivates a portion of the additional phases that makes up a difference between the second number of additional phases and the first number of additional phases (e.g., such that only the first phase and the first number of additional phases remain active). The additional phases are deactivated, for example, based on a determination of the phase shedding circuitry that is operable, in at least one example, to determine the optimal (e.g., most efficient) number of phases to be active in the multi-phase power regulator based on the current draw of the load (e.g., whether increased or decreased). After making the determination, in at least one example, the phase shedding circuitry instructs the phase management circuitry how many (and/or which) additional phases in the multi-phase power regulator to deactivate.

While the operations of the method 300 have been discussed and labeled with numerical reference, the method 300 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. A device that is "configured to" perform a task or function may be configured (e.g., programmed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A circuit for use in system with a multi-phase power regulator to supply power to an electrical load, the multi-phase power regulator including a power stage including a first phase and a second phase, the circuit comprising:
    phase management circuitry to couple to the first phase and the second phase to control the first phase and the second phase;
    a first comparator to couple to an output node of the multi-phase power regulator to compare a first output voltage level at the output node of the multi-phase power regulator to a first threshold value to produce a first comparison result; and
    a second comparator to couple to the output node of the multi-phase power regulator to compare the first output voltage level to a second threshold value to produce a second comparison result, wherein the second threshold value is less than the first threshold value;
    current detection circuitry to detect:
        first electrical characteristics associated with providing a first amount of current to the load at the first output voltage level, the first electrical characteristics indicative of an increased current draw by the load; and
        second electrical characteristics associated with providing a second amount of current to the load at the first output voltage level, the second electrical characteristics indicative of a decreased current draw by the load;
    a load line to lower the first output voltage level based on an increase in current draw by the load; and
    phase shedding circuitry coupled to the first comparator and the second comparator, and the phase management circuitry to control the phase management circuitry to activate or deactivate the second phase based at least partially on the first comparison result and the second comparison result.

2. The circuit of claim 1, wherein the power stage includes three or more phases, the phase shedding circuitry to control the phase management circuitry to activate or deactivate multiple phases based at least partially on at least one of the first and second comparison result.

3. The circuit of claim 1, wherein the first phase comprises:
    a first switch coupled at a first terminal to a voltage source and to couple at a second terminal to a first inductor coupled to the output node of the multi-phase power regulator;
    a second switch coupled between the second terminal of the first switch and a ground voltage potential; and
    a first driver coupled to the first switch and the second switch to control the first switch and the second switch, and
    wherein the second phase comprises:
    a third switch coupled at a first terminal of the third switch to the voltage source and to couple at a second terminal to a second inductor coupled to the output node of the multi-phase power regulator;
    a fourth switch coupled between the second terminal of the third switch and the ground voltage potential; and
    a second driver coupled to the third switch and the fourth switch to control the third switch and the fourth switch.

4. The circuit of claim 3, wherein the phase management circuitry is coupled to the first switch and the second switch to control the first switch and the second switch at least partially based on input received from the phase shedding circuitry.

5. The circuit of claim 1, wherein the first phase comprises a first current sense resistor coupled to the phase shedding circuitry to generate the first electrical characteristics associated with providing the first amount of current, wherein the second phase comprises a second current sense resistor coupled to the phase shedding circuitry to generate the second electrical characteristics associated with providing the first amount of current.

6. A multi-phase power regulator to supply power to an electrical load, comprising:
    a power stage, comprising:
        a first phase, comprising:
            at least a first switch coupled at a first terminal to a voltage source and to couple at a second terminal to a first inductor coupled to an output node of the multi-phase power regulator; and
            a first driver coupled to the first switch to control the first switch; and
        a second phase, comprising:
            at least a second switch coupled at a third terminal to the voltage source and to couple at a fourth terminal to a second inductor coupled to the output node of the multi-phase power regulator; and
            a second driver coupled to the third switch and the fourth switch to control the third switch and the fourth switch;
    current detection circuitry to detect:
        first electrical characteristics associated with providing a first amount of current to the load at a first output voltage level at the output node of the multi-phase power regulator, the first electrical characteristics indicative of an increased current draw by the load; and
        second electrical characteristics associated with providing a second amount of current to the load at the first output voltage level, the second electrical characteristics indicative of a decreased current draw by the load;
    a load line to lower the first output voltage level based on an Increase in current draw by the load; and
    control circuitry comprising:
        phase management circuitry coupled to the first driver and the second driver to control the first driver and the second driver;
        phase shedding circuitry coupled to the phase management circuitry; and a first comparator coupled to the output node of the multi-phase power regulator, the load line and an input of the phase shedding circuitry, and a second comparator coupled to the output node of the multi-phase power regulator, the load line and an input of the phase shedding circuitry.

7. The multi-phase power regulator of claim 6, wherein the first comparator to compare the first output voltage level to a first threshold value to produce a first comparison result, and the second comparator to compare the first output voltage level to a second threshold value to produce a second comparison result, wherein the second threshold value is less than the first threshold value.

8. The multi-phase power regulator of claim 7, wherein the phase shedding circuitry to instruct the phase management circuitry to activate the second phase when the second comparison result indicates that the first output voltage level is less than the second threshold value.

9. The multi-phase power regulator of claim 8, wherein the phase shedding circuitry to instruct the phase management circuitry to deactivate the second phase when the second comparison result indicates that the first output voltage level is not less than the second threshold value.

10. The multi-phase power regulator of claim 6, wherein the first phase comprises a first current sense resistor coupled to the phase shedding circuitry, wherein the second phase comprises a second current sense resistor coupled to the phase shedding circuitry.

\* \* \* \* \*